(12) United States Patent
Jung

(10) Patent No.: US 11,461,232 B2
(45) Date of Patent: Oct. 4, 2022

(54) MEMORY SYSTEM AND OPERATING METHOD OF MEMORY SYSTEM

(71) Applicant: SK hynix Inc., Gyeonggi-do (KR)

(72) Inventor: In Ho Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/372,009

(22) Filed: Jul. 9, 2021

(65) Prior Publication Data

US 2022/0261346 A1 Aug. 18, 2022

(30) Foreign Application Priority Data

Feb. 18, 2021 (KR) .......................... 10-2021-0021548

(51) Int. Cl.
*G06F 12/00* (2006.01)
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0679* (2013.01); *G06F 2212/72* (2013.01)

(58) Field of Classification Search
CPC .. G06F 12/0802; G06F 3/0604; G06F 3/0655; G06F 3/0679; G06F 2212/72
See application file for complete search history.

(56) References Cited

U.S. PATENT DOCUMENTS

| | | | | |
|---|---|---|---|---|
| 8,145,614 | B1* | 3/2012 | Zimran | H04L 67/1097 |
| | | | | 702/182 |
| 2012/0210068 | A1* | 8/2012 | Joshi | G06F 9/45558 |
| | | | | 711/E12.017 |
| 2021/0374523 | A1* | 12/2021 | Gottin | G06N 3/08 |

FOREIGN PATENT DOCUMENTS

KR 10-2018-0124708 A 11/2018
KR 10-2019-0064017 A 6/2019

* cited by examiner

*Primary Examiner* — Shawn X Gu
(74) *Attorney, Agent, or Firm* — IP & T Group LLP

(57) ABSTRACT

Embodiments of the present disclosure relate to a memory system and an operating method of the memory system. According to embodiments of the present disclosure, a memory system may set a plurality of physical function units and a read cache, may calculate, when a Read Look Ahead (RLA) execution condition is satisfied for a first physical function unit among the plurality of physical function units, a calibrated cache hit ratio for the first physical function unit based on one or more cache hit ratios for the first physical function unit calculated after a predetermined first reference time point, and may determine whether to execute an RLA operation for the first physical function unit based on the calibrated cache hit ratio for the first physical function unit.

19 Claims, 18 Drawing Sheets

Host Read

FIG.15
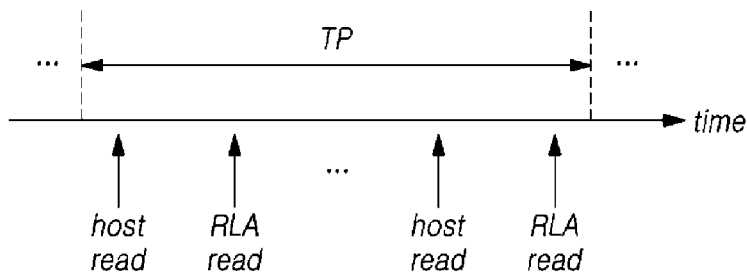
① RLA ratio : (RLA read)/(total Read)
| PF | CCHR (%) |
|---|---|
| PF_1 | 60 |
| PF_2 | 50 |
| ... | ... |
| PF_K-1 | 80 |
| PF_K | 70 |
Determine CHRT
based on ① and ②
- $(CHRT) = 100 - ((W\_1) * (RLA\ ratio) + (W\_2) * (Average\ CCHR))\ (\%)$
- $(W\_1) + (W\_2) = A$
② Average CCHR = (60 + 50 + .. + 80 + 70)/K

MEMORY SYSTEM AND OPERATING METHOD OF MEMORY SYSTEM

CROSS-REFERENCE TO RELATED APPLICATION

The present application claims priority under 35 U.S.C. 119(a) to Korean patent application number 10-2021-0021548 filed on Feb. 18, 2021, which is incorporated herein by reference in its entirety.

BACKGROUND

1. Technical Field

The embodiments of the present disclosure relate to a memory system and an operating method of the memory system.

2. Related Art

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

Moreover, a memory system may cache data stored in the memory device in a cache to perform a read operation requested by the host faster. In this case, the memory system may cache the data requested to be read by the host in the cache, but may cache the data in the cache before the host requests the read.

SUMMARY

Embodiments of the present disclosure may provide a memory system and an operating method of the memory system capable of controlling a plurality of physical function units to efficiently execute the Read Look Ahead (RLA) operation.

In addition, embodiments of the present disclosure may provide a memory system and an operating method of the memory system capable of reducing the size of a buffer allocated for RLA operation in the read cache and minimizing unnecessary read operations.

In one aspect, embodiments of the present disclosure may provide a memory system including a memory device capable of storing data, and a memory controller for communicating with the memory device and controlling the memory device.

The memory controller may include a plurality of physical function units, wherein each of the physical function units processes a read operation requested by a different host, and a read cache capable of caching, from the memory device, data requested to be read by one of the plurality of physical function units from the memory device.

The memory controller may calculate, when a Read Look Ahead (RLA) request execution condition is satisfied for a first physical function unit among the plurality of physical function units, a calibrated cache hit ratio for the first physical function unit based on one or more cache hit ratios for the first physical function unit which is calculated after a predetermined first reference time point, wherein the cache hit ratio is a ratio at which data to be read by the first physical function unit is cached in the read cache and the one or more cache hit ratios are calculated after a predetermined first reference time point.

The memory controller may determine whether to execute an RLA operation for the first physical function unit based on the calibrated cache hit ratio for the first physical function unit.

The memory controller may set an average of cache hit ratios (ACHR) which is calculated before a predetermined second reference time point among the one or more cache hit ratios, selectively setting a latest cache hit ratio (LCHR) which is calculated recently among cache hit ratios calculated after the second reference time point. In addition, the memory controller may calculate the calibrated cache hit ratio based on at least one of the ACHR and the LCHR.

The memory controller may determine to execute the RLA operation for the first physical function unit when the calibrated cache hit ratio is greater than or equal to a threshold cache hit ratio.

In another aspect, embodiments of the present disclosure may provide an operating method of a memory system including a memory device capable of storing data.

The operating method of the memory system may include monitoring a Read Look Ahead (RLA) request execution condition for a first physical function unit among a plurality of physical function units, wherein each of the physical function units processes a read operation requested by a different host.

The operating method of the memory system may include calculating, when the RLA request execution condition is satisfied for the first physical function unit, a calibrated cache hit ratio for the first physical function unit based on one or more cache hit ratios for the first physical function unit, wherein the cache hit ratio is a ratio at which data to be read is cached in a read cache capable of caching, from the memory device, data requested to be read by one of the plurality of physical function units and the one or more cache hit ratios are calculated after a predetermined first reference time point.

As an example, calculating the calibrated cache hit ratio may include 1) setting an average of cache hit ratio (ACHR) which is calculated before a predetermined second reference time point among the one or more cache hit ratios, 2) selectively setting a latest cache hit ratio (LCHR) which is calculated recently among cache hit ratios calculated after the second reference time point, and 3) calculating the calibrated cache hit ratio based on at least one of the ACHR and the LCHR.

The operating method of the memory system may include determining whether to execute an RLA operation for the first physical function unit based on the calibrated cache hit ratio for the first physical function unit.

In this case, determining whether to execute the RLA operation for the first physical function unit may include determining to execute the RLA operation for the first physical function unit when the calibrated cache hit ratio is greater than or equal to a threshold cache hit ratio.

According to embodiments of the present disclosure, it is possible to control a plurality of physical function units to efficiently execute the RLA operation, reduce the size of a buffer allocated for the RLA operation in the read cache, and minimize unnecessary read operations.

BRIEF DESCRIPTION OF THE DRAWINGS

FIG. 15 is a diagram illustrating an example of an operation of determining a threshold cache hit ratio by a memory system according to embodiments of the present disclosure.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
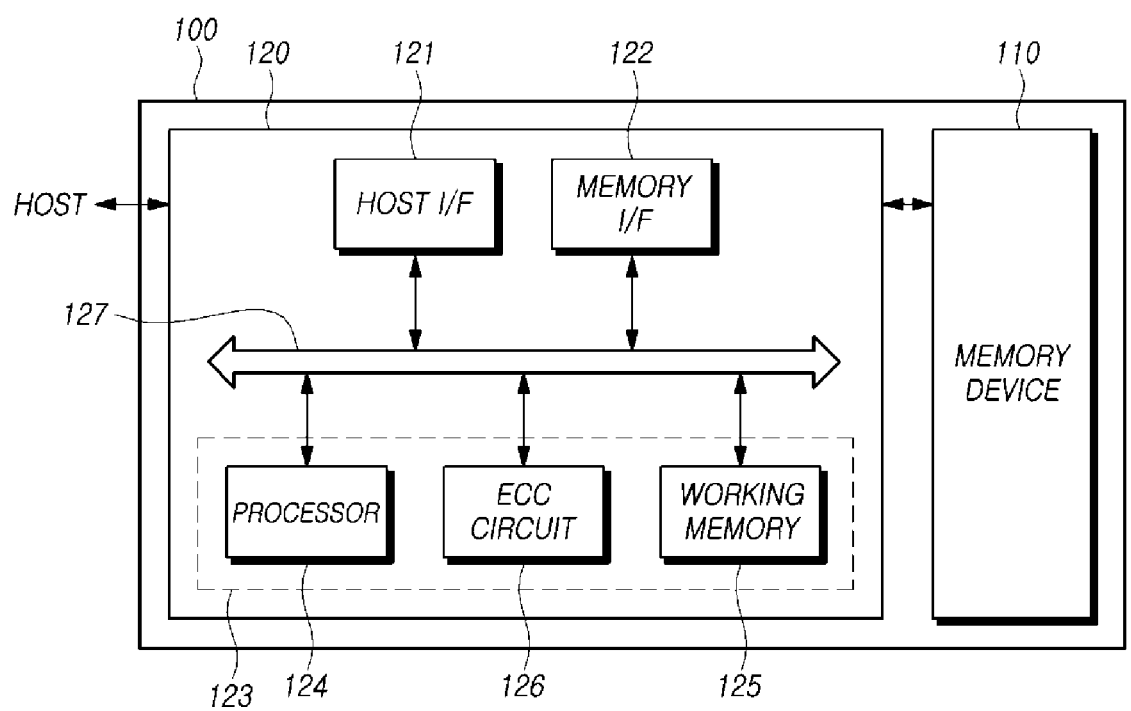
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all of the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
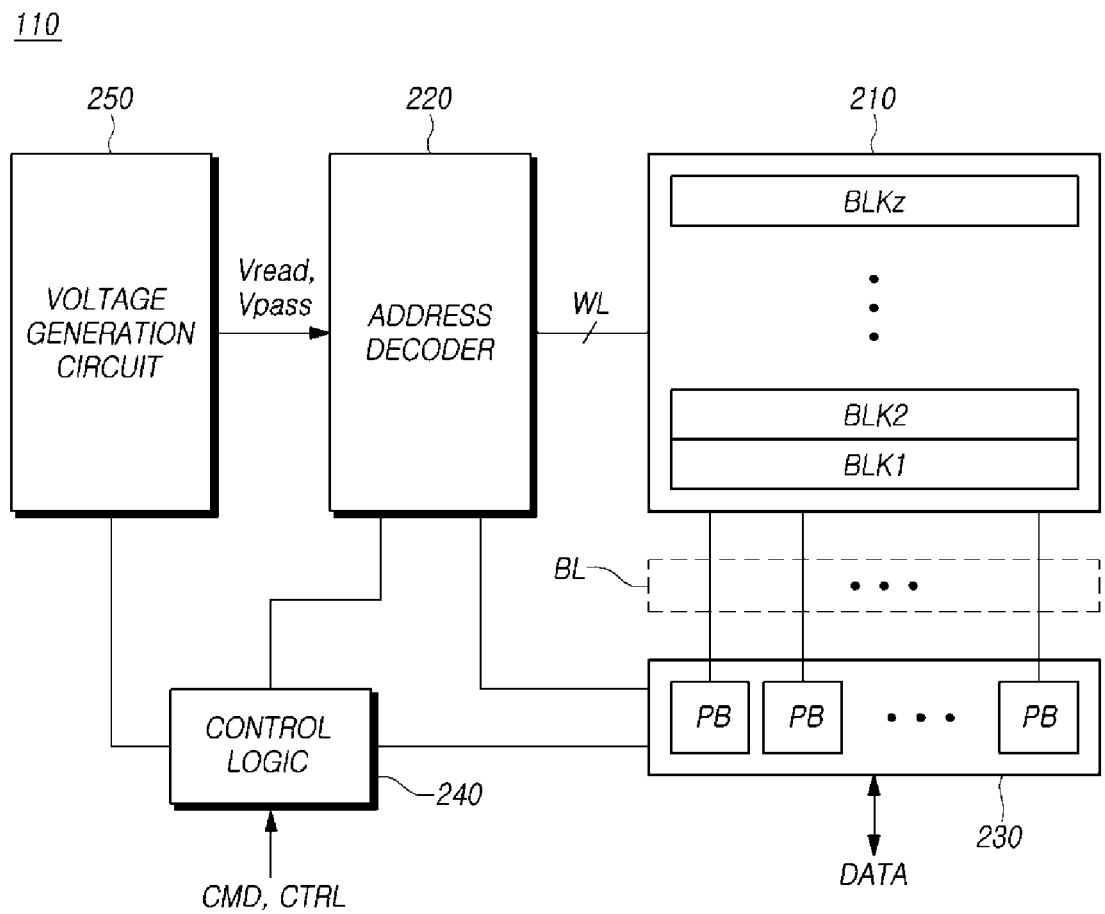
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. In another example, each of the multiple memory cells included in the memory cell array 210 may be a multi-level cell (MLC) configured to store two bits of data per memory cell. In another example, each of the multiple memory cells included in the memory cell array 210 may be a triple-level cell (TLC) configured to store three bits of data per memory cell. In another example, each of the multiple memory cells included in the memory cell array 210 may be a quad-level cell (QLC) configured to store four bits of data per memory cell. In another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. In another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
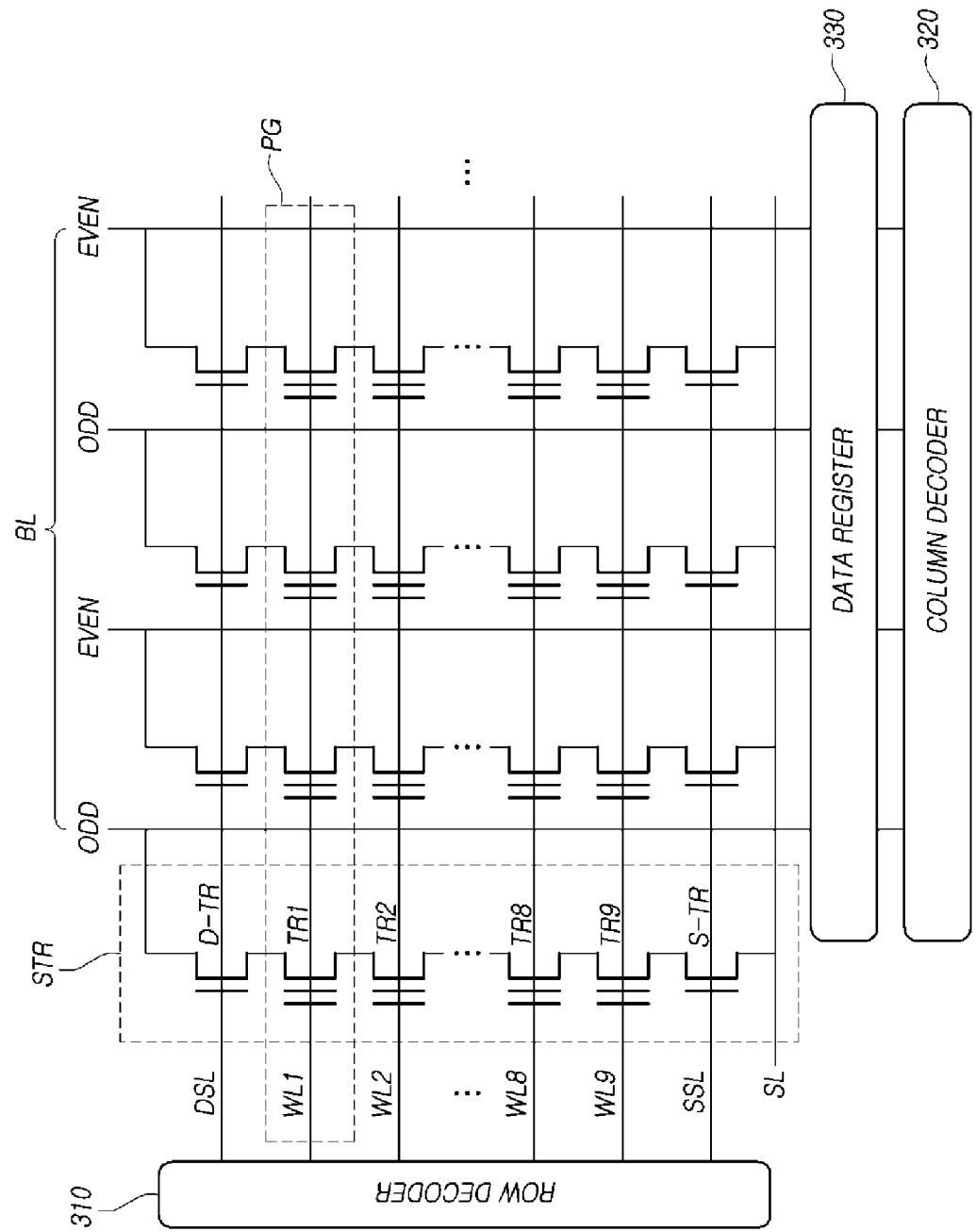
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there is may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
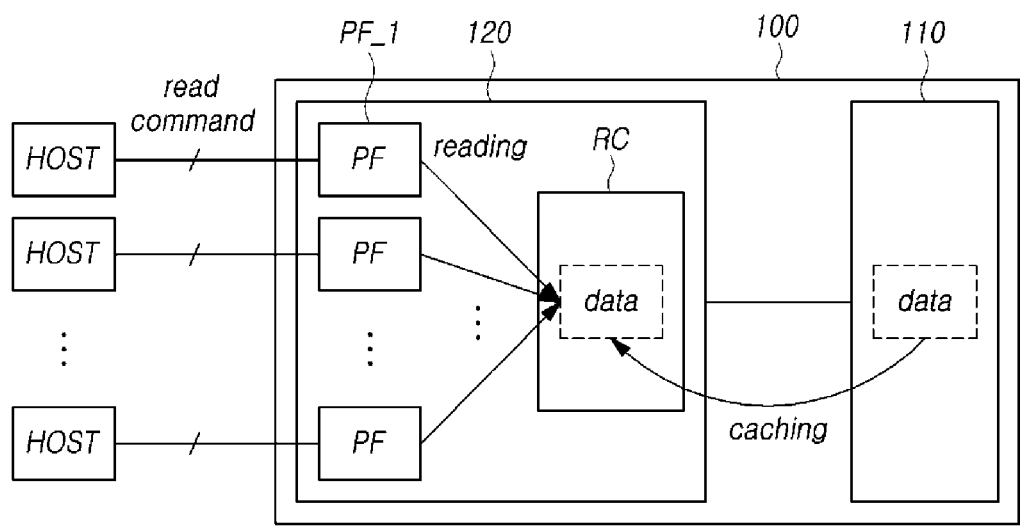
FIG. 4 is a diagram illustrating a schematic structure of a memory system according to embodiments of the present disclosure.

FIG. 4 is a diagram illustrating a schematic structure of a memory system 100 according to embodiments of the present disclosure.

Referring to FIG. 4, a memory controller 120 of the memory system 100 may set a plurality of physical function units PFs and a read cache RC.

In the embodiments of the present disclosure, each of the plurality of physical function units PFs is a module capable of processing a read operation requested by a different host. Each of the plurality of physical function units PFs may have a different ID, and may have a unique namespace or a namespace shared with other physical function units.

The different hosts corresponding to each of the plurality of physical function units PFs may be hosts operating on different physical devices, or different virtual hosts operating on one physical device. In the case that a host corresponding to each of the plurality of physical function units PFs is a virtual host, an intermediate operating system for managing an interface between a physical device in which the virtual host runs and a virtual host operating system running the virtual host may be used.

Moreover, in the case that the different virtual hosts correspond to each of the plurality of physical function units PFs, each of the plurality of physical function units PFs operates regardless of whether the corresponding host is a virtual host. Each of the plurality of physical function units PFs cannot identify whether the corresponding host is a virtual host.

Each of the plurality of physical function units PFs may be configured as an independent circuit, but may be configured as a hardware or software module operating on one common circuit. In this case, each of the plurality of physical function units PFs may have an independent control register.

As an example, in the case that the memory system 100 communicates with a plurality of hosts using the PCIe protocol, each of the plurality of physical function units PFs may be an NVMe controller module which shares one PCIe port and can perform PCI functions for different hosts.

The read cache RC may cache data requested to be read by any of the plurality of physical function units PFs from a memory device 110. For example, the read cache RC may be a specific memory area or a memory chip on a working memory 125 of the memory controller 120.

In embodiments of the present disclosure, the read cache RC may be shared by the plurality of physical function units PFs.

In addition, the memory controller 120 may allocate or release one or more buffers to store different types of data in the read cache RC.

The first physical function unit PF_1, which is one of the plurality of physical function units PFs, may read data from the read cache RC instead of directly reading data from the memory device 110 in order to rapidly process a read operation requested by a corresponding host.

In this case, if the data is already cached in the read cache RC, the memory controller 120 transfers the cached data to the first physical function unit PF_1. In addition, if the data is not cached in the read cache RC, the memory controller may read the data from the memory device 110 and cache the read data in the read cache RC, then transfer the cached data to the first physical function unit PF_1.

The memory controller 120 may execute a read look ahead (RLA) operation separately from executing a read operation requested from a host through a plurality of physical function units PFs.

The RLA operation may refer to an operation of pre-reading data that the host has not yet requested to read. The memory controller 120 may determine, based on the read request pattern from the host that there is a high possibility that the host will soon request to read data of a specific address within the memory device 110 even when the host has not yet requested to read the data of the specific address. In this case, the memory controller 120 may cache the data in the read cache RC even if there is no read request for the data of the specific address from the host.

As an example, the memory controller 120 may execute the RLA operation when the read request pattern of a host is a sequential read pattern. For example, the host transmits a sequential read request to the memory system 100. In this case, when the host requests to read data of the first address, since read requests are sequentially transmitted, the memory controller 120 may determine that there is a high possibility that data of a second address adjacent to the first address is read by the host. Accordingly, the memory controller 120 may read the data of the second address from the memory device 110 in advance and cache the read data of the second address into the read cache RC before the host requests to read the data of the second address.

As described above, the memory controller 120 may cache data which has a high possibility of being requested by the host, from the memory device 110 in the read cache RC in advance, so that, when the host subsequently requests to read the corresponding data, it is possible to shorten a response time by immediately transmitting the cached data from the read cache RC to the host without having to search for the data in the memory device 110.

Hereinafter, a comparison of an example of executing the RLA operation by the memory controller 120 and an example of executing a read request received from a host, will be described.

Figure 5:
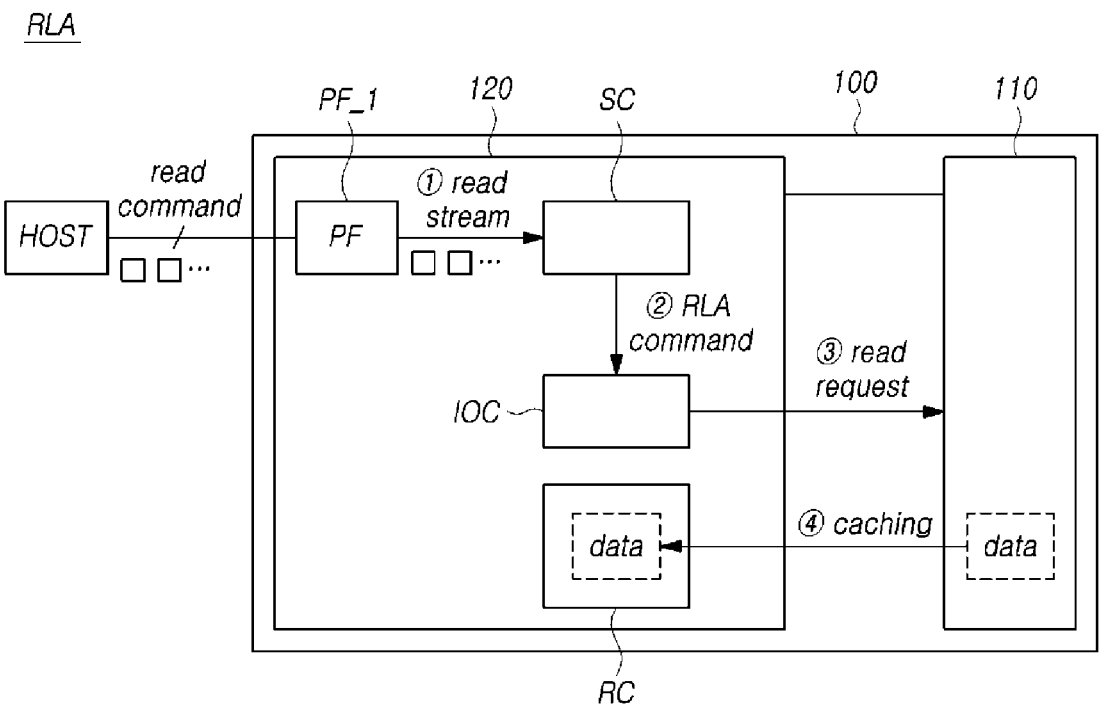
FIG. 5 is a diagram illustrating an example of executing an RLA read operation by a memory system according to embodiments of the present disclosure.

FIG. 5 is a diagram illustrating an example of executing an RLA read operation by a memory system 100 according to embodiments of the present disclosure.

Referring to FIG. 5, a memory controller 120 of the memory system 100 may check a series of commands, that is, a read stream input from a first physical function unit PF_1 through a stream checker SC (①). The first physical function unit PF_1 may transmit the series of read commands respectively indicating read requests from a host to the stream checker SC, and the stream checker SC may determine whether the RLA operation is required to be executed by analyzing the read streams transmitted from the first physical function unit PF_1. In this case, for example, the stream checker SC may be implemented as a firmware module run by the processor 124 of the memory controller 120 or as a hardware module inside the processor 124.

In addition, the stream checker SC may generate and transmit the RLA request to the input/output core IOC in the case that it is determined that the RLA operation is required to be executed (②). The input/output core (IOC) is a core for performing a data transmission and reception between the memory controller 120 and the memory device 110, and may execute operations of the host interface layer (HIL), flash translation layer (FTL) and flash interface layer (FIL) as described above. For example, the input/output core (IOC) may be one or more cores included in the processor 124 of the memory controller 120.

The input/output core (IOC) may request data corresponding to the RLA request to the memory device 110 in order to process the received RLA request (③). In addition, the input/output core IOC may cache data read from the memory device 110 in the read cache RC (④). In this way, the memory controller 120 may cache the corresponding data in the read cache RC before receiving a read request for the corresponding data from the host. However, since the host did not actually transmit a read request for the corresponding data, the data cached in the read cache RC is not transmitted to the host through the first physical function unit PF_1.

Figure 6:
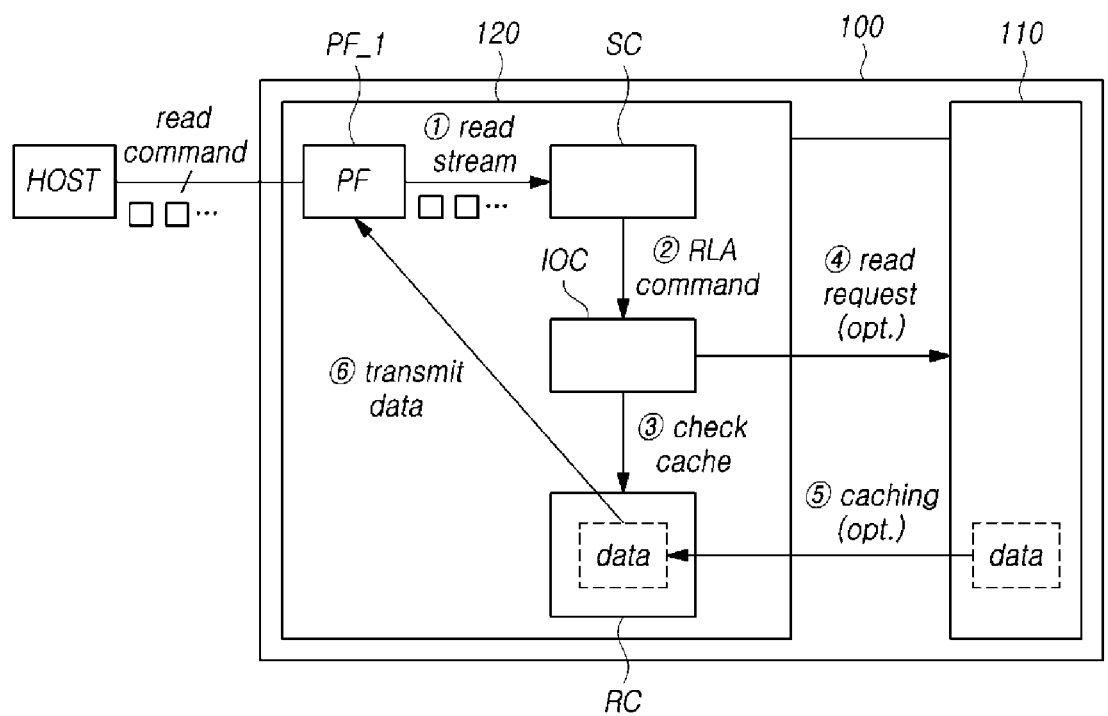
FIG. 6 is a diagram illustrating an example in which a memory system according to embodiments of the present disclosure executes a read request received from a host.

FIG. 6 is a diagram illustrating an example in which a memory system 100 according to embodiments of the present disclosure executes a read request received from a host.

Referring to FIG. 6, similar to FIG. 5, the memory controller 120 of the memory system 100 may check a read stream input from a first physical function unit PF_1 through a stream checker SC (①).

In the case that the memory controller 120 determines that it is necessary to process a read request received from a host through the stream checker SC, the memory controller 120 may transmit the read request received from the host to an input/output core IOC (②).

The input/output core IOC checks whether the data requested by the received read request is cached in a read cache RC (③). If the data is not cached in the read cache RC, the input/output core IOC requests the data to the memory device 110 (④), reads the data from the memory device 110, and then cache the read data into the read cache RC (⑤). In addition, the input/output core IOC may transfer the cached data from the read cache RC to the first physical function unit PF_1 (⑥). For example, the input/output core IOC may execute a direct memory access (DMA) between the read cache RC and the first physical function unit PF_1 so that data cached in the read cache RC can be transferred to the first physical function unit PF_1.

On the other hand, if the corresponding data is already cached in the read cache RC, the input/output core IOC may directly transfer the cached data to the first physical function unit PF_1 (⑥).

As described above, in the case that the memory controller 120 executes an RLA operation for reading data stored in a specific address in advance, the data stored in the corresponding address is already cached in the read cache RC when the host transmits a read request for data stored in the address. Accordingly, there is an advantage in that the memory controller 120 can more rapidly process the read request for data stored in a corresponding address.

However, if the host does not later transmit the read request for data stored in the corresponding address, the memory controller 120 may use resources to perform unnecessary caching operations. In addition, if data which is not read by the host is stored in the read cache RC, since the operation of evicting data not read by the host from the read cache RC frequently occurs in the subsequent process of processing the read request from the host, there may be a problem that the performance of processing the read request from the host decreases, and the number of times for reading data from the memory device 110 increases, thereby shortening the life of the memory system 100.

Further, since the capacity of the read cache RC is limited, there may be a problem that all of the plurality of physical function units PFs set by the memory controller 120 may not execute the RLA operation at the same time.

Accordingly, the memory controller 120 can execute the RLA operation only when it is determined that the read request received from the host can be more efficiently processed when executing the RLA operation. For example, the memory controller 120 may analyze a read request received from the host and execute an RLA operation only for data that is likely to be accessed by the host soon. As another example, the memory controller 120 may execute the RLA operation only when the cache hit ratio of the read cache RC increases. Through this, the memory controller 120 may enable the plurality of physical function units PFs to efficiently execute the RLA operation.

In addition, the memory controller 120 may execute the RLA operation only for a specific physical function unit required to improve the performance of a read operation thereof among the plurality of physical function units PFs. In this way, the memory controller 120 can reduce the size of a buffer allocated for unnecessary RLA operations, and minimize unnecessary read operations.

Figure 7:
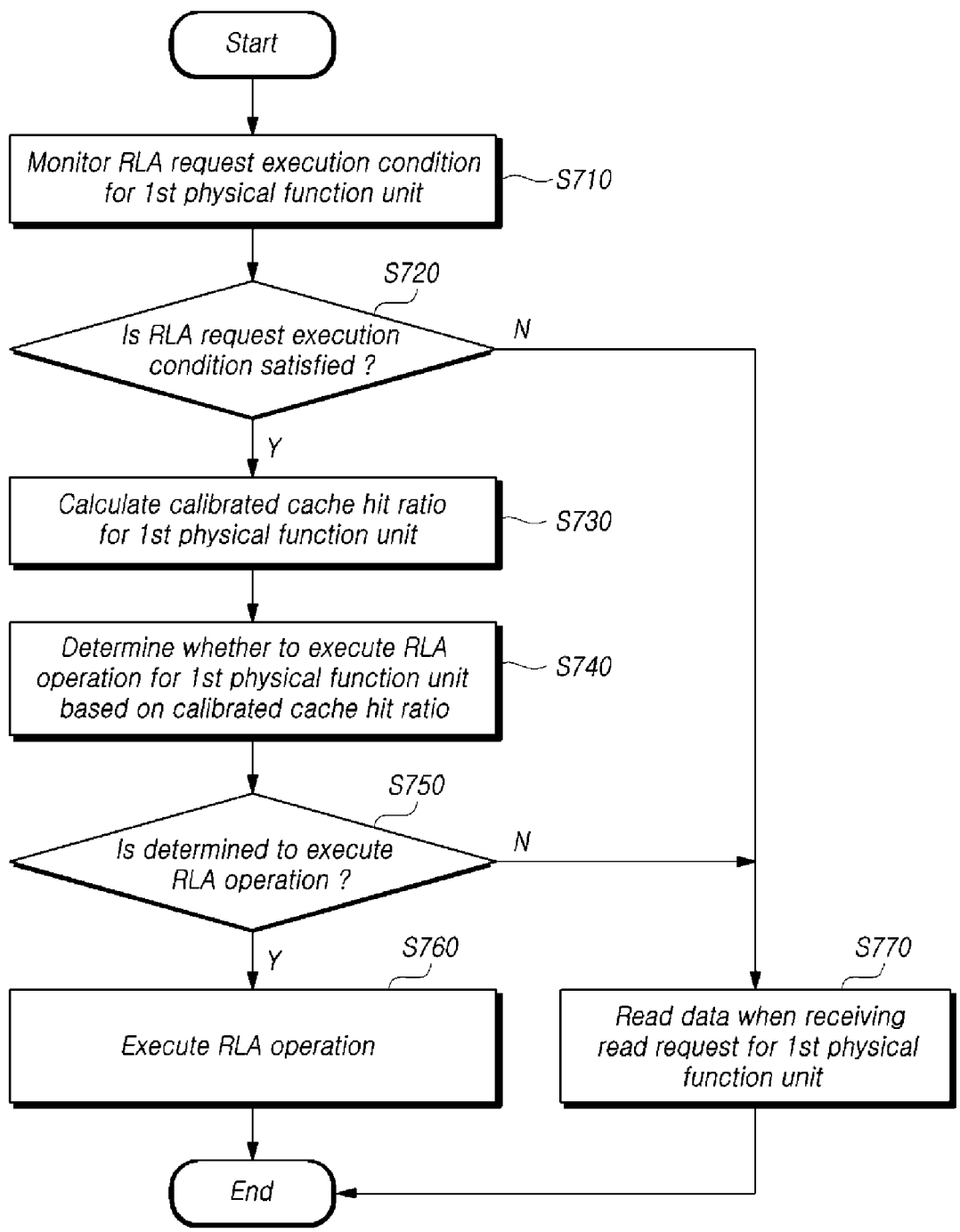
FIG. 7 is a flowchart illustrating an operation of a memory system according to embodiments of the present disclosure.

Hereinafter, a process in which the memory controller 120 of the memory system 100 determines whether to execute the RLA operation with reference to a flowchart will be described FIG. 7 is a flowchart illustrating an operation of a memory system 100 according to embodiments of the present disclosure.

Referring to FIG. 7, a memory controller 120 of the memory system 100 may monitor a condition capable of executing an RLA request for the first physical function unit PF_1 among the plurality of physical function units PFs (S710).

As an example, the memory controller 120 of the memory system 100 may determine whether a read request for a consecutive address has been received a predetermined number of times or more from a host corresponding to the first physical function unit PF_1. This is because, if the host transmits a read request for consecutive addresses to the memory system 100, there is a high possibility of transmitting a read request for a subsequent address to the memory system 100.

The memory controller 120 determines whether the RLA request execution condition for the first physical function unit PF_1 is satisfied (S720).

If the RLA request execution condition for the first physical function unit PF_1 is satisfied (S720-Y), the memory controller 120 may first calculate a calibrated cache hit ratio (CCHR) for the first physical function unit PF_1 (S730). Further, the memory controller 120 may determine whether to execute the RLA operation for the first physical function unit PF_1 based on the calibrated cache hit ratio CCHR for the first physical function unit PF_1 calculated in operation S730 (S740).

If the memory controller 120 determines to execute the RLA operation for the first physical function unit PF_1 (S750-Y), the memory controller 120 may execute the RLA operation (S760).

If the RLA request execution condition for the first physical function unit PF_1 is not satisfied in operation S720 (S720-N), or the memory controller 120 determines not to execute the RLA operation for the first physical function unit PF_1 in operation S740 (S750-N), the memory controller 120 does not execute the RLA operation, and may read data requested to be read by the host from the memory device 110 when receiving a read request for the first physical function unit PF_1 from the host (S770).

Moreover, the above-described calibrated cache hit ratio CCHR for the first physical function unit PF_1 may be calculated based on one or more cache hit ratios CHRs for the first physical function unit PF_1. The cache hit ratios CHRs may be calculated after a predetermined reference time point. The cache hit ratio CHR for the first physical function unit PF_1 refers to a rate at which data to be read by the first physical function unit PF_1 is cached in the read cache RC during a predetermined amount of time. A cache hit occurs when read requested data is currently cached in the read cache RC and thus the read requested data is provided not from the memory device 110 but from the read cache RC. A cache hit does not occur when read requested data is not currently cached in the read cache RC and thus the read requested data is not provided from the read cache RC but from the memory device 100. For example, in the case that the first physical function unit PF_1 reads 4 KB data 10 times during the predetermined amount of time and 6 times thereof are cache hits, the cache hit ratio CHR during the predetermined amount of time is 6/10=60%.

In embodiments of the present disclosure, the reason for the memory controller 120 determining whether to execute the RLA operation for the first physical function unit PF_1 using the calibrated cache hit ratio CCHR is to prevent the problem of erroneously determining whether to execute the RLA operation for the first physical function unit PF_1 when the value of the cache hit ratio CHR for the first physical function unit PF_1 changes significantly according to the time.

Hereinafter, an example in which the memory controller 120 of the memory system 100 calculates the calibrated cache hit ratio CCHR will be described.

Figure 8:
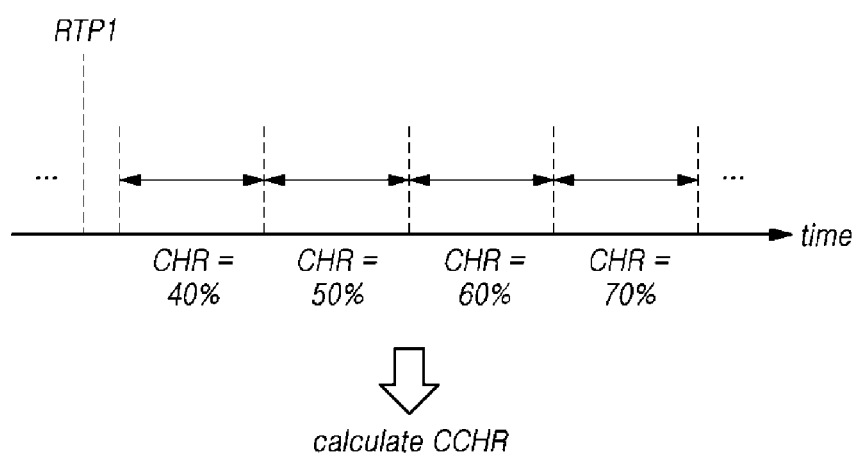
FIG. 8 is a diagram illustrating an example in which a memory system according to embodiments of the present disclosure calculates a calibrated cache hit ratio for a first physical function unit.

FIG. 8 is a diagram illustrating an example in which a memory system 100 according to embodiments of the present disclosure calculates a calibrated cache hit ratio CCHR for a first physical function unit PF_1.

Referring to FIG. 8, a memory controller 120 of the memory system 100 may calculate a calibrated cache hit ratio CCHR for a first physical function unit PF_1 based on one or more cache hit ratios CHRs for the first physical function unit PF_1 calculated after a predetermined first reference time point RTP1.

In FIG. 8, the cache hit ratios CHRs for the first physical function unit PF_1 calculated after the first reference time point RTP1 are 40%, 50%, 60%, and 70%, respectively.

In this case, each cache hit ratio CHR may be measured every specific amount of time or every predetermined number of times (e.g., 10 times) to read data from the read cache RC. In addition, the first reference time point RTP1 need not always be a fixed value and may be reset.

Hereinafter, a specific example in which the memory controller 120 calculates the calibrated cache hit ratio CCHR based on one or more cache hit ratios CHRs for the first physical function unit PF_1 calculated after the first reference time point RTP1 will be described.

As an example, the memory controller 120 of the memory system 100 may set one or more of average of cache hit ratios (ACHR) and latest cache hit ratio (LCHR) which is calculated recently for the first physical function unit PF_1 based on one or more cache hit ratios CHRs for the first physical function unit PF_1 calculated after the first reference time point RTP1, and may calculate the calibrated cache hit ratio CCHR for the first physical function unit PF_1 based on at least one of the ACHR and LCHR for the first physical function unit PF_1.

The memory controller 120 may set, as an ACHR, an average of the CHR(cache hit ratio)s calculated before a predetermined second reference time point among the one or more CHRs for the first physical function unit calculated after the first reference time point RTP1. In this case, the second reference time point RTP2 is a specific time point after the first reference time point RTP1.

The memory controller 120 may selectively set, as a LCHR, the CHR last recently calculated among the CHRs calculated after the second reference time point RTP2.

If there is no CHR calculated after the second reference time point RTP2, the LCHR does not exist because there is no cache hit ratio value capable of being set as LCHR. In addition, in the case that the memory controller 120 initializes the LCHR, the LCHR does not exist.

Figure 9:
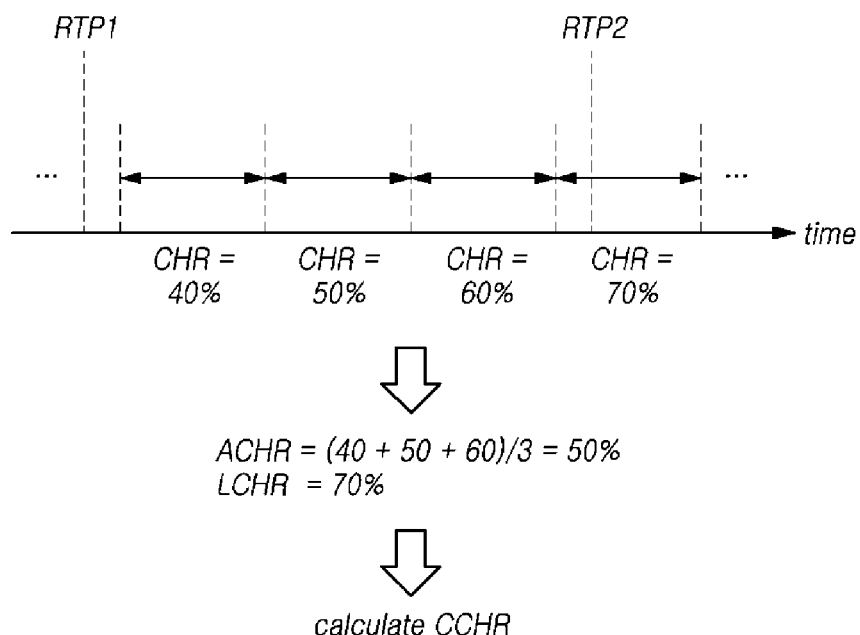
FIG. 9 is a diagram illustrating an example of setting an ACHR and an LCHR by a memory system according to embodiments of the present disclosure.

FIG. 9 is a diagram illustrating an example of setting an ACHR and an LCHR by a memory system 100 according to embodiments of the present disclosure.

Referring to FIG. 9, the cache hit ratios for the first physical function unit calculated after the first reference time point RTP1 are 40%, 50%, 60%, and 70%, respectively.

Here, the ACHR is set to 50%, which is an average of 40%, 50%, and 60% of cache hit ratios calculated before the second reference time point RTP2. In addition, the LCHR is set to 70%, which is the cache hit ratio calculated after the second reference time point RTP2. In this case, the memory controller 120 may calculate the calibrated cache hit ratio CCHR based on the ACHR value of 50% and the LCHR value of 70%.

Figure 10:
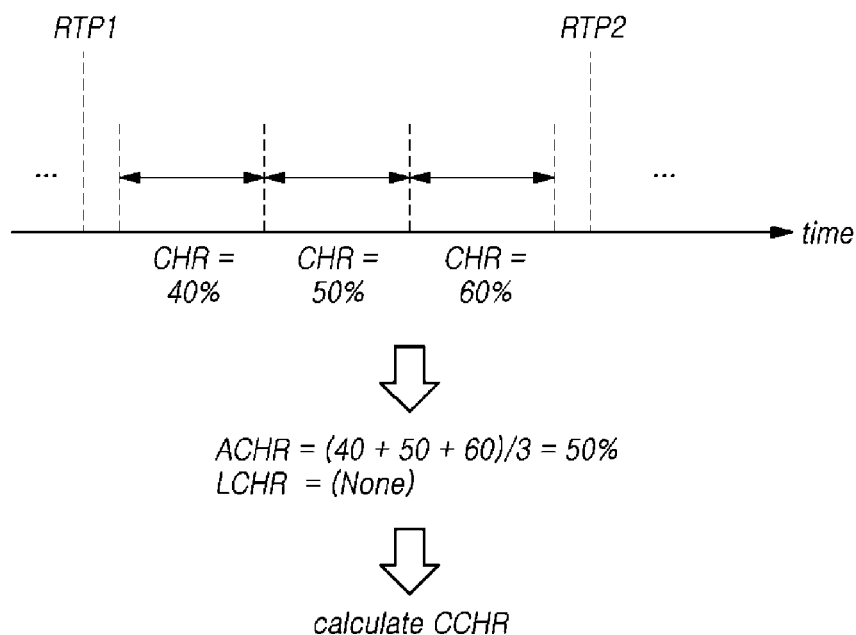
FIG. 10 is a diagram illustrating another example of setting ACHR and LCHR by a memory system according to embodiments of the present disclosure.

FIG. 10 is a diagram illustrating another example of setting ACHR and LCHR by a memory system 100 according to embodiments of the present disclosure.

Referring to FIG. 10, the cache hit ratios for the first physical function unit calculated after the first reference time point RTP1 are 40%, 50%, and 60%, respectively.

Here, the ACHR is set to 50%, which is an average of 40%, 50%, and 60% of cache hit ratios calculated before the second reference time point RTP2. However, in FIG. 10, since there is no cache hit ratio calculated after the second reference time point RTP2, the LCHR does not exist. In this case, the memory controller 120 may calculate the calibrated cache hit ratio CCHR based on the ACHR value of 50%.

Figure 11:
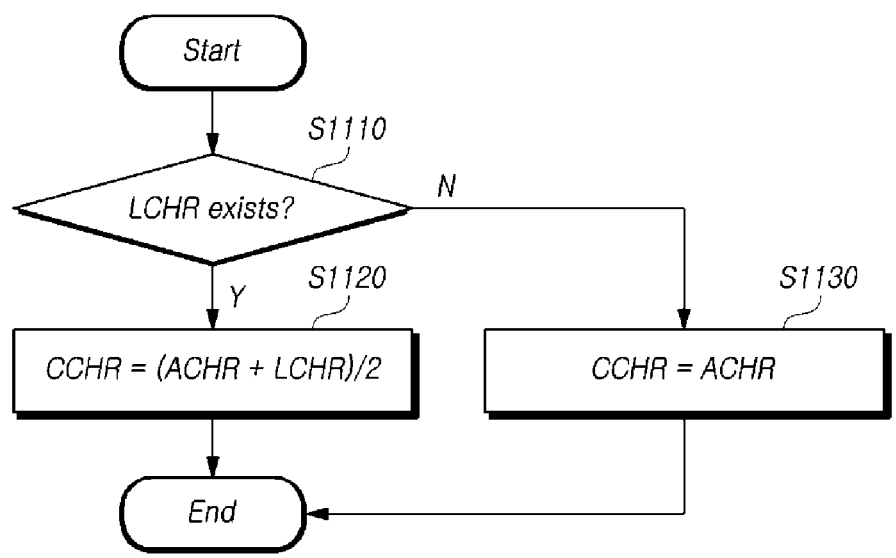
FIG. 11 is a flowchart illustrating an operation of calculating a calibrated cache hit ratio for a first physical function unit based on ACHR and LCHR by a memory system according to embodiments of the present disclosure.

FIG. 11 is a flowchart illustrating an operation of calculating a calibrated cache hit ratio for a first physical function unit PF_1 based on ACHR and LCHR by a memory system 100 according to embodiments of the present disclosure.

Referring to FIG. 11, the memory controller 120 of the memory system 100 determines whether the LCHR exists (S1110). As described above, if the cache hit ratio calculated after the second reference time point RTP2 does not exist or the memory controller 120 initializes the LCHR, the LCHR does not exist.

In the case that the LCHR exists (S1110-Y), the memory controller 120 may set the calibrated cache hit ratio CCHR to the average of ACHR and LCHR, that is, (ACHR+LCHR)/2 (S1120).

On the other hand, in the case that the LCHR does not exist (S1110-N), the memory controller 120 may set the calibrated hit ratio CCHR to ACHR (S1130).

In the above, it has been described a method of calculating the calibrated cache hit ratio CCHR based on at least one of ACHR and LCHR by the memory system 100.

Hereinafter, an example of a time point at which the memory system 100 initializes the ACHR and LCHR used to calculate the calibrated cache hit ratio CCHR will be described.

Figure 12:
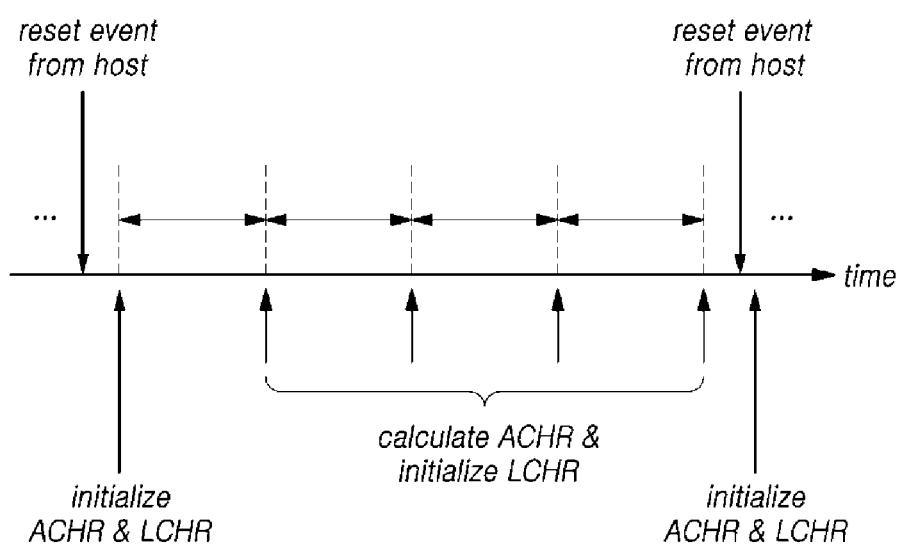
FIG. 12 is a diagram illustrating an example of a time point when an ACHR and an LCHR are initialized by a memory system according to embodiments of the present disclosure.

FIG. 12 is a diagram illustrating an example of a time point when an ACHR and an LCHR are initialized by a memory system 100 according to embodiments of the present disclosure.

Referring to FIG. 12, the memory controller 120 of the memory system 100 may initialize ACHR and LCHR when receiving a reset event from a host corresponding to the first physical function unit PF_1. The reset event may be a command or an electrical signal instructing to initialize the ACHR and the LCHR.

In addition, the memory controller 120 may initialize the LCHR at the time when the ACHR is recalculated. For example, the memory controller 120 may recalculate ACHR at each predetermined specific period, and initialize the LCHR after recalculating ACHR. At this time, as described above, if the LCHR is initialized, the LCHR value does not exist.

Figure 13:
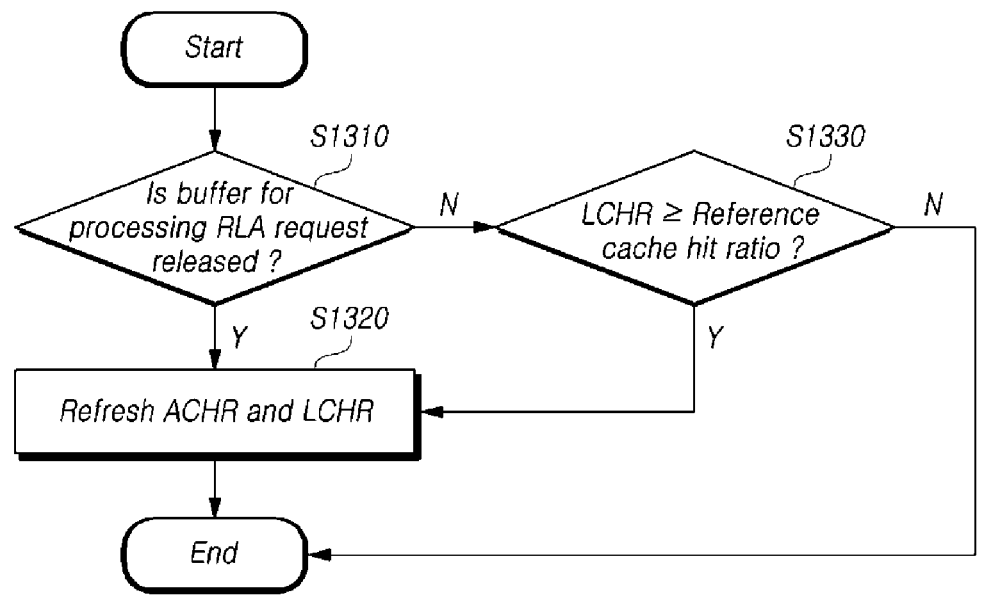
FIG. 13 is a flowchart illustrating an example of a time point at which a memory system updates ACHR and LCHR according to embodiments of the present disclosure.

FIG. 13 is a flowchart illustrating an example of a time point at which a memory system 100 updates ACHR and LCHR according to embodiments of the present disclosure.

Referring to FIG. 13, the memory controller 120 of the memory system 100 determines whether a buffer for processing an RLA request in the read cache RC has been released (S1310).

In embodiments of the present disclosure, the memory controller 120 may allocate a buffer for an RLA request or a buffer for a read request received from the host in the read cache RC and may release the allocated buffer from the read cache RC. In this case, in order to process the read request received from the host prior to the RLA request, the memory controller 120 may release the buffer allocated for the RLA request and may use the reserved memory to process the read request received from the host.

In the case that the memory controller 120 releases a buffer allocated to process the RLA request from the read cache RC (S1310-Y), the memory controller 120 may update the ACHR and the LCHR (S1320). For example, the memory controller 120 may refresh the ACHR and the LCHR according to the method described with reference to FIG. 9 or 10.

On the other hand, in the case that the memory controller 120 does not release the buffer allocated to process the RLA request from the read cache RC (S1310-N), the memory controller 120 determines whether the LCHR is equal to or greater than the reference cache hit ratio (e.g. 90%) (S1330). The reference cache hit ratio may be a predetermined value. If the LCHR is greater than or equal to the reference cache hit ratio (S1330-Y), the memory controller 120 may initialize the ACHR and the LCHR (S1320).

Figure 14:
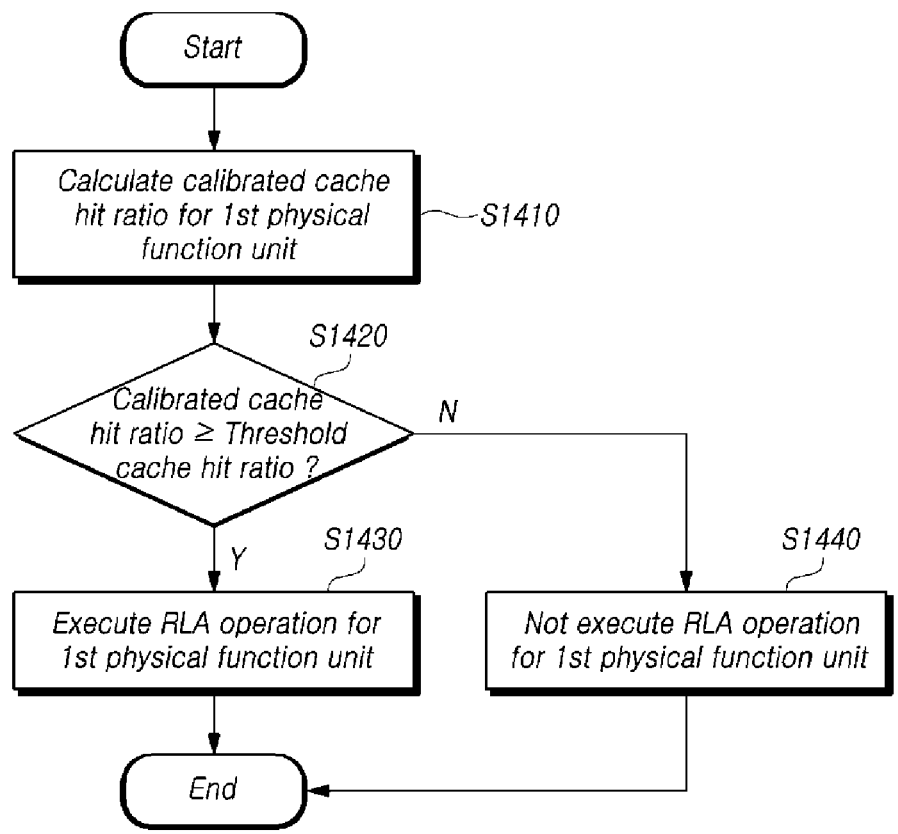
FIG. 14 is a flowchart illustrating an operation of determining whether to execute an RLA operation for a first physical function unit by a memory system according to embodiments of the present disclosure.

FIG. 14 is a flowchart illustrating an operation of determining whether to execute an RLA operation for a first physical function unit PF_1 by a memory system 100 according to embodiments of the present disclosure.

Referring to FIG. 14, the memory controller 120 of the memory system 100 may calculate the calibrated cache hit ratio CCHR for a first physical function unit PF_1 (S1410). The memory controller 120 may use the method described in FIGS. 8 to 11 to calculate the calibrated cache hit ratio CCHR.

The memory controller 120 determines whether the calibrated cache hit ratio CCHR calculated in operation S1410 is equal to or greater than a threshold cache hit ratio CHRT (S1420).

In the case that the calibrated cache hit ratio CCHR is greater than or equal to the threshold cache hit ratio CHRT (S1420-Y), the memory controller 120 may execute an RLA operation for the first physical function unit PF_1 (S1430). On the other hand, if the calibrated cache hit ratio CCHR is less than the threshold cache hit ratio CHRT (S1420-N), the memory controller 120 does not execute the RLA operation for the first physical function unit PF_1 (S1440).

Hereinafter, an example of an operation of determining the threshold cache hit ratio CHRT, which is a criterion for determining whether to execute the RLA operation for the first physical function unit PF_1, will be described.

FIG. 15 is a diagram illustrating an example of an operation of determining a threshold cache hit ratio CHRT by a memory system 100 according to embodiments of the present disclosure.

Referring to FIG. 15, the memory controller 120 of the memory system 100 may determine a threshold cache hit ratio based on 1) an RLA ratio and 2) an average calibrated cache hit ratio.

First, the RLA ratio refers to the ratio of the number of RLA requests related to one of the physical function units to the total number of outstanding read requests related to one of the physical function units during a predetermined time period TP.

In embodiments of the present disclosure, the read request processed by the memory controller 120 may be an RLA request or a read request received from a host. The memory controller 120 may calculate the value of the RLA ratio by counting the number of RLA requests and read requests received from the host during a predetermined time period TP. For example, if there are 6 read requests received from the host and 4 RLA requests among 10 outstanding read requests created during a predetermined time period TP, the RLA ratio is 40%.

In addition, the average calibrated cache hit ratio refers to an average of the calibrated cache hit ratios CCHRs for the respective physical function units PFs included in the memory controller 120 during the predetermined time period TP.

As an example, there are K physical function units PFs in the memory controller 120, and the calibrated cache hit ratios CCHR for the respective K physical function units are 60%, 50%, . . . , 80% and 70%. In this case, the average calibrated cache hit ratio is (60+50+ . . . +80+70)/K %. If there are four physical function units in the memory controller 120 and the calibrated cache hit ratios CCHRs for each physical function unit are 60%, 50%, 80%, and 70%, respectively, the average calibrated cache hit ratio is (60+50+80+70)/4=65%.

Hereinafter, an example in which the memory controller 120 determines the threshold cache hit ratio CHRT based on the RLA ratio and the average calibrated cache hit ratio will be described.

For example, the memory controller 120 may determine the threshold cache hit ratio CHRT based on a value obtained by multiplying the RLA ratio by a first weight W_1 and a value obtained by multiplying the average calibrated cache hit ratio by a second weight W_2. In this case, the memory controller 120 may set the first weight W_1 and the second weight W_2 so that the sum of the first weight and the second weight is constant.

In FIG. 15, the threshold cache hit ratio may be determined as in Equation 1.

(Threshold cache hit ratio CHRT)=100−((1st weight)
*(RLA ratio)+(2nd weight)*(Average calibrated
cache hit ratio))  [Equation 1]

As an example, 100 outstanding read requests create during a predetermined time period TP, and 50 RLA requests are among them. In addition, there are four physical function units PFs in the memory controller 120, and the calibrated cache hit ratios for each physical function unit are 60%, 50%, 80%, and 70%, respectively. In addition, the sum of the first weight W_1 and the second weight W_2 is 100.

In this case, the RLA ratio is 50/100=50% and the average calibrated cache hit ratio is (60+50+80+70)/4=65%.

Further, the value of the first weight is 60 and the value of the second weight is 40. In this case, the threshold cache hit ratio CHRT calculated by Equation 1 above is as follows.

(CHRT)=100−(60*0.5+40*0.65)=56(%)

That is, in the case that the calibrated cache hit ratio CCHR for the first physical function unit PF_1 is 56% or more, the memory controller 120 determines to execute the RLA operation for the first physical function unit PF_1.

Referring to Equation 1, as the RLA ratio increases due to a decrease in read requests received from the host, the threshold cache hit ratio CHRT decreases, thereby increasing the probability of executing the RLA operation. On the other hand, as the number of read requests received from the host increases and the RLA ratio decreases, the threshold cache hit ratio CHRT increases, so the probability of executing the RLA operation decreases.

Figure 16:
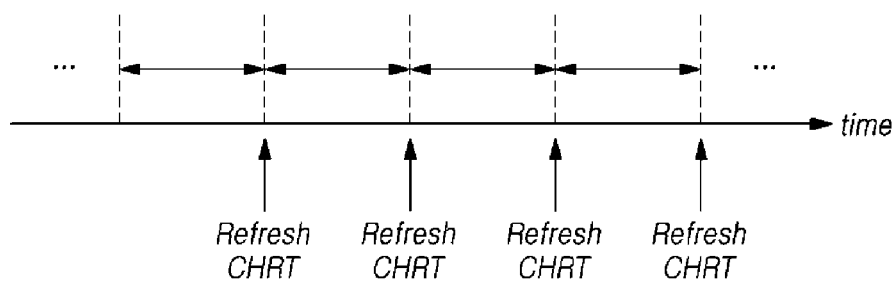
FIG. 16 is a diagram illustrating an example of a time point at which a memory system updates a threshold cache hit ratio according to embodiments of the present disclosure.

FIG. 16 is a diagram illustrating an example of a time point at which a memory system 100 updates a threshold cache hit ratio according to embodiments of the present disclosure.

Referring to FIG. 16, the memory controller 120 of the memory system 100 may update the threshold cache hit ratio CHRT every set period. In this case, the period for refreshing the threshold cache hit ratio CHRT may be different from the period for recalculating the ACHR.

Figure 17:
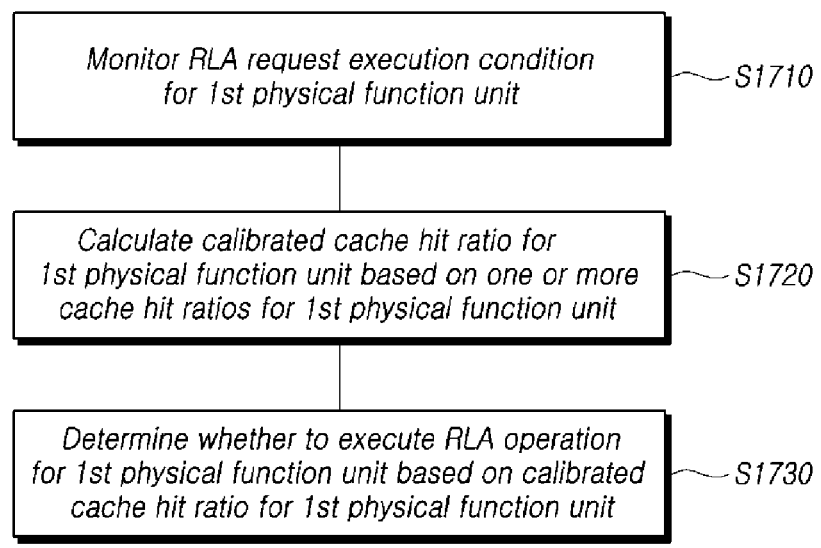
FIG. 17 is a diagram illustrating an operating method of a memory system according to embodiments of the present disclosure.

FIG. 17 is a diagram illustrating an operating method of a memory system 100 according to embodiments of the present disclosure.

Referring to FIG. 17, an operating method of the memory system 100 may include monitoring an RLA request execution condition for a first physical function unit PF_1 among a plurality of physical function units PFs (S1710). Each of the physical function units may process a read operation requested by a different host.

In addition, the operating method of the memory system 100 may include calculating, when the RLA request execution condition is satisfied for the first physical function unit PF_1 is satisfied, a calibrated cache hit ratio CCHR for the first physical function unit PF_1 based on the one or more cache hit ratios CHRs for the first physical function unit PF_1 (S1720). The cache hit ratio may be calculated after a predetermined first reference time point RTP1.

In this case, the cache hit ratio CHR refers to a ratio at which data to be read is cached in a read cache RC. The read cache RC may cache data, which is read from the memory device 110 of the memory system 100.

As an example, the operation S1720 may include setting ACHR, which is an average of cache hit ratios calculated before the second reference time point RTP2 among one or more cache hit ratios CHRs for the first physical function unit PF_1.

In addition, the operation S1720 may include selectively setting an LCHR which is a recently calculated cache hit ratio among cache hit ratios calculated after the second reference time point RTP2.

Further, the operation S1720 may include calculating a calibrated cache hit ratio CCHR based on at least one of ACHR and LCHR.

In this case, the calibrated cache hit ratio CCHR may be calculated as the ACHR in the case when the LCHR does not exist, and may be calculated as an average of the ACHR and the LCHR in the case when the LCHR exists.

For example, the ACHR may be initialized when receiving a reset event from a host corresponding to the first physical function unit PF_1, and the LCHR may be initialized at a time when the ACHR is recalculated. As another example, the ACHR and the LCHR may be initialized when a buffer allocated for an RLA request in the read cache RD is released, or when the LCHR is greater than or equal to a reference cache hit ratio.

In addition, the operating method of the memory system 100 may include determining whether to execute an RLA operation for the first physical function unit PF_1 based on the calibrated cache hit ratio CCHR for the first physical function unit PF_1 calculated in operation S1720 (S1730).

Operation S1730 may include determining to execute the RLA operation for the first physical function unit PF_1 in the case that the calibrated cache hit ratio CCHR is greater than or equal to a threshold cache hit ratio CHRT.

In this case, the threshold cache hit ratio CHRT may be determined based on 1) a RLA ratio which is a ratio of the number of RLA requests to the total number of outstanding read requests during a predetermined time period, and 2) an average calibrated cache hit ratio which is an average of the calibrated cache hit ratios for the respective physical function units PFs. As an example, the threshold cache hit ratio CHRT may be determined based on a value obtained by multiplying the RLA ratio by a first weight W_1 and a value obtained by multiplying the average calibrated cache hit ratio by a second weight W_2. In this case, the sum of the first weight and the second weight may be constant.

Further, the threshold cache hit ratio CHRT may be updated every set period.

Moreover, the operation of the memory controller 120 described above may be controlled by a control circuit 123, and may be performed in the manner that the processor 124 executes (i.e., runs) the firmware in which all operations of the memory controller 120 are programmed.

Figure 18:
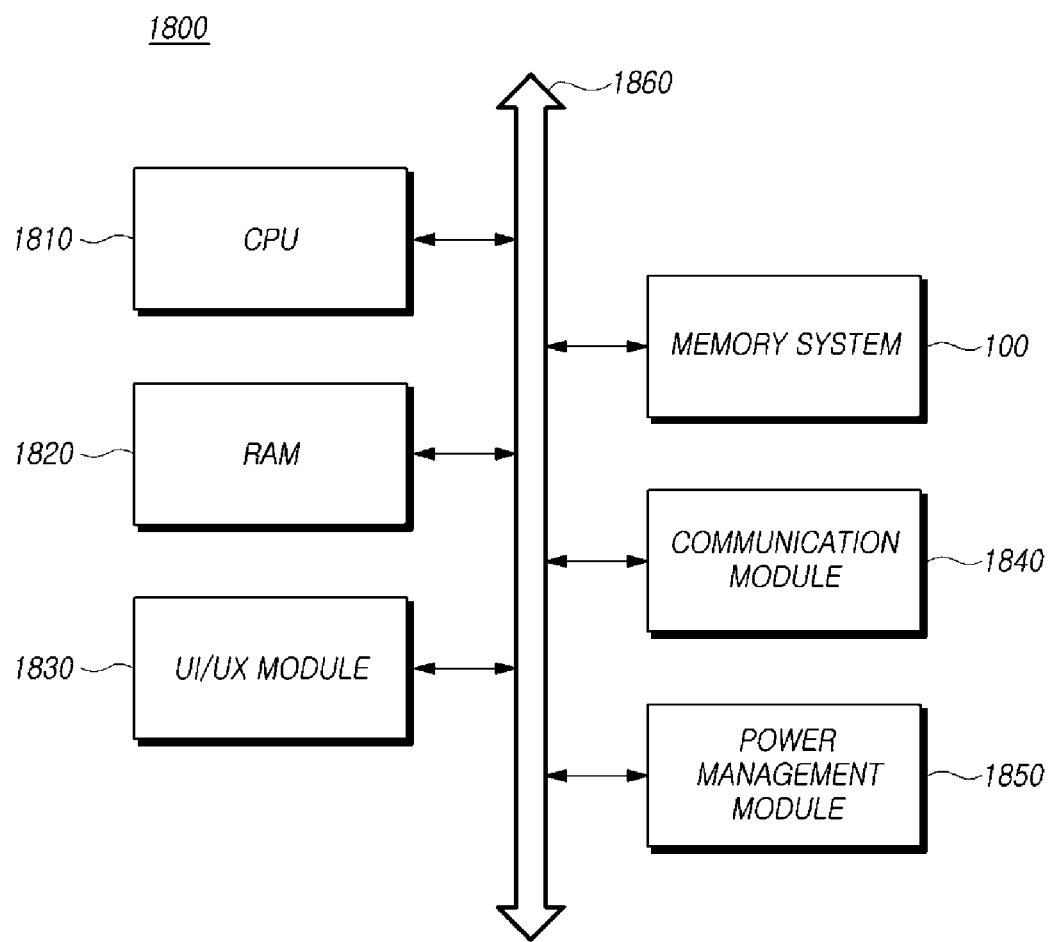
FIG. 18 is a diagram illustrating the configuration of a computing system based on some embodiments of the disclosed technology.

FIG. 18 is a diagram illustrating the configuration of a computing system 1800 based on an embodiment of the disclosed technology.

Referring to FIG. 18, the computing system 1800 based on an embodiment of the disclosed technology may include: a memory system 100 electrically connected to a system bus 1860; a CPU 1810 configured to control the overall operation of the computing system 1800; a RAM 1820 configured to store data and information related to operations of the computing system 1800; a user interface/user experience (UI/UX) module 1830 configured to provide the user with a user environment; a communication module 1840 configured to communicate with an external device as a wired and/or wireless type; and a power management module 1850 configured to manage power used by the computing system 1800.

The computing system 1800 may be a personal computer (PC) or may include a mobile terminal such as a smartphone, a tablet or various electronic devices.

The computing system 1800 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure. Therefore, the present disclosure is not restricted to the above-described embodiments and many variations are possible within the spirit and scope of the present disclosure and the following claims. Further, the embodiments may be combined to form additional embodiments.

What is claimed is:

1. A memory system comprising:
a memory device capable of storing data; and
a memory controller for communicating with the memory device and controlling the memory device,
wherein the memory controller is configured to:
set a plurality of physical function units and a read cache capable of caching, from the memory device, data requested to be read by one of the plurality of physical function units from the memory device,
calculate, when a Read Look Ahead (RLA) request execution condition is satisfied for a first physical function unit among the plurality of physical function units, a calibrated cache hit ratio for the first physical function unit based on one or more cache hit ratios for the first physical function unit calculated after a predetermined first reference time point, wherein the calibrated cache hit ratio is a ratio at which data to be read by the first physical function unit is cached in the read cache and the one or more cache hit ratios are calculated after the predetermined first reference time point, and
determine whether to execute an RLA operation for the first physical function unit based on the calibrated cache hit ratio for the first physical function unit.

2. The memory system of claim 1, wherein the memory controller calculates the calibrated cache hit ratio by:
setting an average of cache hit ratios (ACHR) which is calculated before a predetermined second reference time point among the one or more cache hit ratios, selectively setting a latest cache hit ratio (LCHR) which is calculated recently among cache hit ratios calculated after the second reference time point, and calculating the calibrated cache hit ratio based on at least one of the ACHR and the LCHR.

3. The memory system of claim 2, wherein the memory controller calculates the ACHR as the calibrated cache hit ratio when the LCHR does not exist, and calculates an average of the ACHR and the LCHR as the calibrated cache hit ratio when the LCHR exists.

4. The memory system of claim 2, wherein the memory controller is further configured to:
initialize the ACHR when receiving a reset event from a host corresponding to the first physical function unit, and
initializes the LCHR at a time when recalculating the ACHR.

5. The memory system of claim 2, wherein the memory controller is further configured to initialize the ACHR and the LCHR when a buffer allocated for an RLA request is released from the read cache, or when the LCHR is greater than or equal to a reference cache hit ratio.

6. The memory system of claim 1, wherein the memory controller determines to execute the RLA operation for the first physical function unit when the calibrated cache hit ratio is greater than or equal to a threshold cache hit ratio.

7. The memory system of claim 6, wherein the memory controller is further configured to determine the threshold cache hit ratio based on a RLA ratio which is a ratio of a number of RLA requests to a total number of outstanding read requests during a predetermined time period, and an average calibrated cache hit ratio which is an average of calibrated cache hit ratios for respective physical function units.

8. The memory system of claim 7, wherein the memory controller determines the threshold cache hit ratio based on a value obtained by multiplying the RLA ratio by a first weight and a value obtained by multiplying the average of calibrated cache hit ratios for the respective physical function units by a second weight, and wherein a sum of the first weight and the second weight so that the sum of the first weight and the second weight is constant.

9. The memory system of claim 6, wherein the memory controller is further configured to update the threshold cache hit ratio every set period.

10. An operating method of a memory system including a memory device capable of storing data comprising:
    monitoring a Read Look Ahead (RLA) request execution condition for a first physical function unit among a plurality of physical function units;
    calculating, when the RLA request execution condition is satisfied for the first physical function unit, a calibrated cache hit ratio for the first physical function unit based on one or more cache hit ratios for the first physical function unit, wherein calibrated the cache hit ratio is a ratio at which data to be read is cached in a read cache capable of caching, from the memory device, data requested to be read by one of the plurality of physical function units and the one or more cache hit ratios are calculated after a predetermined first reference time point, and
    determining whether to execute an RLA operation for the first physical function unit based on the calibrated cache hit ratio for the first physical function unit.

11. The operating method of the memory system of claim 10, wherein calculating the calibrated cache hit ratio comprises,
    setting an average of cache hit ratios (ACHR) which is calculated before a predetermined second reference time point among the one or more cache hit ratios;
    selectively setting a latest cache hit ratio (LCHR) which is calculated recently among cache hit ratios calculated after the second reference time point; and
    calculating the calibrated cache hit ratio based on at least one of the ACHR and the LCHR.

12. The operating method of the memory system of claim 11, wherein the ACHR is calculated as the calibrated cache hit ratio when the LCHR does not exist, and an average of the ACHR and the LCHR is calculated as the calibrated cache hit ratio when the LCHR exists.

13. The operating method of the memory system of claim 11, further comprising:
    initializing the ACHR when receiving a reset event from a host corresponding to the first physical function unit, and
    initializing the LCHR at a time when recalculating the ACHR.

14. The operating method of the memory system of claim 11, further comprising initializing the ACHR and the LCHR when a buffer allocated for an RLA request is released from the read cache, or when the LCHR is greater than or equal to a reference cache hit ratio.

15. The operating method of the memory system of claim 10, wherein determining whether to execute the RLA operation for the first physical function unit comprises determining to execute the RLA operation for the first physical function unit when the calibrated cache hit ratio is greater than or equal to a threshold cache hit ratio.

16. The operating method of the memory system of claim 15, further comprising determining the threshold cache hit ratio based on a RLA ratio which is a ratio of a number of RLA requests to a total number of outstanding read requests during a predetermined time period, and an average calibrated cache hit ratio which is an average of calibrated cache hit ratios for respective physical function units.

17. The operating method of the memory system of claim 16, wherein the threshold cache hit ratio is determined based on a value obtained by multiplying the RLA ratio by a first weight and a value obtained by multiplying the average of calibrated cache hit ratios for the respective physical function units by a second weight, and
    wherein a sum of the first weight and the second weight is constant.

18. The operating method of the memory system of claim 15, further comprising updating the threshold cache hit ratio every set period.

19. A memory controller for controlling a memory device, the memory controller comprising:
    a cache;
    a control circuit configured to perform read look ahead (RLA) operations in response to one or more RLA requests and configured to perform normal read operations in response to one or more normal read requests; and
    one or more read modules each configured to generate an RLA request to provide a corresponding host with data from the cache and each configured to generate a normal read request to provide the corresponding host with data from the memory device,
    wherein the control circuit performs an RLA operation for a selected one of the one or more read modules when a following condition is met:

((calibrated cache hit ratio (CCHR))≥(threshold cache hit ratio (TCHR)), where:

CCHR=((average of cache hit ratio (ACHR))+(recent cache hit ratio (RCHR)))/2 when the recent cache hit ratio (RCHR) is available, CCHR=ACHR when the RCHR is unavailable, and TCHR=100−($W1$*read look ahead (RLAR)+$W2$* (average of calibrated cache hit ratio (ACCHR)), where:

ACHR represents an average of cache hit ratios of the selected read module for the cache, the cache hit ratios being calculated during a first time period,
    RCHR represents a first calculated cache hit ratio of the selected read module for the cache after the first time period,
    RLAR represents a ratio of a number of the one or more RLA requests to a number of outstanding ones of the one or more normal read requests during a second time period,
    ACCHR represents an average of CCHRs of a respective read modules during the second time period, and
    a sum of W1 and W2, which are weight values, is constant.

* * * * *